United States Patent
Syed et al.

(10) Patent No.: US 9,292,795 B2
(45) Date of Patent: Mar. 22, 2016

(54) INTERPRETATION ENGINE USING THREE PREDICATE VALUES AND CONTENT ADDRESSABLE MEMORY

(71) Applicant: NXP B.V., Eindhoven (NL)

(72) Inventors: Aly Aamer Syed, Deurne (NL); Anna Magdalena Kosek, San Jose, CA (US)

(73) Assignee: NXP B.V., Eindhoven (NL)

(*) Notice: Subject to any disclaimer, the term of this patent is extended or adjusted under 35 U.S.C. 154(b) by 259 days.

(21) Appl. No.: 14/055,762

(22) Filed: Oct. 16, 2013

(65) Prior Publication Data
US 2014/0181000 A1   Jun. 26, 2014

(30) Foreign Application Priority Data
Nov. 1, 2012 (EP) .................................. 12190957

(51) Int. Cl.
| | | |
|---|---|---|
| *G06F 17/00* | (2006.01) | |
| *G06N 7/00* | (2006.01) | |
| *G06N 7/08* | (2006.01) | |
| *G06N 5/04* | (2006.01) | |
| *G06Q 10/06* | (2012.01) | |
| *G06Q 10/10* | (2012.01) | |

(52) U.S. Cl.
CPC ................. *G06N 5/04* (2013.01); *G06Q 10/06* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 5,764,895 A | * | 6/1998 | Chung | H04L 45/7453 370/402 |
| 2004/0054690 A1 | * | 3/2004 | Hillerbrand | G06Q 10/06 |
| 2006/0190461 A1 | | 8/2006 | Schaefer | |
| 2008/0204193 A1 | * | 8/2008 | Zai | H04W 4/08 340/10.1 |

FOREIGN PATENT DOCUMENTS

| | | |
|---|---|---|
| JP | 2010157176 | 7/2010 |
| KR | 20070039785 | 4/2007 |

OTHER PUBLICATIONS

Masolo, C. et al. "WonderWeb Deliverable D18", The WonderWeb Library of Foundational Ontologies Preliminary Report, pp. 349 (2001).
Qin, W. et al. "Ontology-Based Context-Aware Middleware for Smart Spaces" Tsinghua Science and Technology, vol. 12, No. 6, pp. 707-713 (Dec. 2007).
Qian, Z. "Formal Descriptive Mechanism of the Ontology Language RDF", Intl. Conf. on Management of e-Commerce and e-Government, pp. 221-225 (Oct. 2008).
Syed, A.A. et al. "An Architecture for Self-Organization in Pervasive Systems", Design, Automation & Test in Europe Conf. & Exhibition, pp. 1548-1553, (Mar. 2010).
Kosek, A.M. et al. "RDF Recipes for Context-Aware Interoperability in Pervasive Systems" IEEE symp. on Computers and Communications, pp. 1017-1022 (Jun. 2010).

(Continued)

*Primary Examiner* — Li-Wu Chang
(74) *Attorney, Agent, or Firm* — Rajeev Madnawat

(57) ABSTRACT

An interpretation engine for an interoperable device is disclosed. The interpretation engine is configured to receive data and to determine a function to be executed in response to the received data and in accordance with a knowledge base that comprises one or more relationships that are structured in triplets. Each triplet comprises a subject, a predicate and an object. The interpretation engine is configured to recognize only a predetermined, fixed plurality of predicate values.

9 Claims, 8 Drawing Sheets

(56) References Cited

OTHER PUBLICATIONS

Bhardwaj, S. et al. "Power-Managed Smart Lighting Using a Semantic Interoperability Architecture", IEEE Trans. on Consumer Electronic s, pp. 8 (May 2011).

Ellenberg, J. et al., "An Environment for Context-Aware Application in Smart Homes", Intl. Conf. on Indoor Positioning and Indoor Navigation, pp. 21-23 (Sep. 2011).

Lassila, O. et al. "Resource Description Framework (RDF) Model and Syntax Specification", 37 pgs. Retrieved from the Internet Oct. 29, 2012 at: http://www.w3.org/TR/PR-rdf-syntax/.

Liebich, T. et al. "Current IFC Releases", 1 pg., retrieved from tje Internet Oct. 29, 2012 at: http://buildingsmart-tech.org/specifications/ifc-releases/summary.

"Smart-M3", 6 pgs. Retrieved from the Internet Oct. 29, 2102 at http://en.wikipedia.org/wiki/SmartM3.

Content-Addressable Memory, 4 pgs., retrieved from the Internet at: http://en.wikipedia.org/wiki/Content-addressable_memory.

Extended European Search Report for EP Patent Appln. No. 12190957.6 (Apr. 2, 2013).

\* cited by examiner

INTERPRETATION ENGINE USING THREE PREDICATE VALUES AND CONTENT ADDRESSABLE MEMORY

CROSS-REFERENCE TO RELATED APPLICATIONS

This application claims the priority under 35 U.S.C. §119 of European patent application no. 12190957.6, filed on Nov. 1, 2012, the contents of which are incorporated by reference herein.

The invention relates to interpretation engines. Specifically, although not exclusively, the invention relates to an interpretation engine configured to process only a predetermined, fixed plurality of predicates.

Smart devices are used in automated building systems to control aspects of the building's operation, such as lighting, heating, air conditioning and alarm systems. The number of devices included in automated building systems increases every day. One reason for this increase is that better control of climate conditions inside buildings given the effect of weather conditions outside the building is needed to reduce energy consumption in buildings. In total, buildings consume around 200 EJ/annum, which is a significant amount of the world's energy consumption. While conserving energy, these automated building systems are also required to provide comfort to occupants of the buildings.

A single automated system may control several different aspects of services of a building and so contain lots of different types of smart devices, each of which may be responsible for a specific function. These functions could be, for example: actuation, such as operating a lamp that produces light; or sensing, such as air temperature sensing. These simple but numerous smart devices need to interoperate to form a control system that meets energy consumption and cost requirements. A smart space, or environment, can consist of various device types and support multiple device and user activities and situations.

Interoperability of smart devices is especially difficult to achieve when systems comprise smart devices from a plurality of vendors, which typically use different operating systems and computer platforms. Interoperability can be achieved with the use of a common ontology model to describe device behaviour depending on a situation.

It is possible to provide a model for constructing a set of autonomous devices in an environment into a virtual device that can perform a function required to facilitate a user activity, such as providing lighting when the user is reading. For example, a number of autonomous lamps can join with autonomous sensors to perform a lighting task (function) without the need for there to be a central controlling entity.

It is also possible to provide a way to use a resource description framework (RDF) to create sequences of steps that form a procedure that a smart device or virtual machine can follow as a "recipe" to perform a specific task in response to changes in an environment. In the case of a system comprising lamps and sensors, these recipes can be the steps a lamp needs to take to control the amount of light that it gives out for a sensed amount of light depending on human activity in the environment at that time. For example, the lamp may be required to provide more light when people are working, but less light when they are relaxing.

In a RDF, it is possible to describe a relationship between a subject and an object using any predicate according to the needs of a particular domain. This means that for different domains, different sets of predicates can be invented to concisely express relationships. However, complex operations must be performed to link a predicate to a domain and a namespace (e.g. a vocabulary that is specific to or within the domain) that is associated with it. The conventional von Neumann architecture for interpreting ontologies is costly, both in terms of power required for operation and the expense of providing the required hardware.

According to a first aspect of the invention there is provided an interpretation engine for an interoperable device, the interpretation engine configured to receive data and to determine a function to be executed in response to the received data and in accordance with a knowledge base that comprises one or more relationships that are structured in triplets, wherein each triplet comprises a subject, a predicate and an object, and wherein the interpretation engine is configured to recognize only a predetermined, fixed plurality of predicate values.

The predetermined plurality of predicate values may be three values or four values.

In some examples, each predicate must take a value from the set: a predicate that indicates that the subject belongs to a class denoted by the object; a predicate that indicates that the subject comprises or possesses the object; a predicate that indicates that the subject takes a literal value denoted by the object.

The determination of a function to be executed may be performed by hardwired logic. The interpretation engine may be provided by hardware alone.

The interpretation engine may be further configured to determine if no function is to be executed in response to the received data and in accordance with the knowledgebase. The function may be a function of the interoperable device or a communication function with another interoperable device. The function of the interoperable device may be a sensing function.

A further aspect of the invention relates to an interoperable device comprising the interpretation engine and a memory. The memory may be non-volatile memory. The interpretation engine may be configured to enter a sleep state when it is not responding to received data. The memory may be content addressable memory. The memory may comprise the knowledge base. The memory may be categorized according to values of predicates of relationships in the knowledge base. The interoperable device may be configured to execute a function that the interpretation engine has determined is to be executed.

A further aspect of the invention relates to a virtual machine comprising one or more of the interoperable devices connected in a network.

A further aspect of the invention relates to a request centre configured to send data to a virtual machine, the data indicative of a function to be performed and comprises one or more relationships that are structured in triplets, wherein each triplet comprises a subject, a predicate and an object, and wherein the request centre is configured to use only a predetermined, fixed plurality of predicate values.

A further aspect of the invention relates to a method for operating an interoperable device, the method comprising:
  receiving data; and
  determining a function to be executed in response to the
    received data and in accordance with a knowledge base,
    wherein the knowledge base comprises one or more relationships that are structured in triplets, each triplet comprising a subject, a predicate and an object, and wherein the predicate can only take one of a predetermined, fixed plurality of predicate values.

The received data may be received from a network comprising a request centre and/or another interoperable device.

Determining a function to be executed in response to the received data and in accordance with a knowledge base may comprise comparing a value of the received data with a relationship or a subject, predicate or object of a relationship in the knowledge base. Determining a function to be executed in response to the received data and in accordance with a knowledge base may comprise determining a function to be executed in accordance with an outcome of the comparison.

The method may further comprise executing the function if it is determined that a function is to be executed.

Embodiments of the present invention will now be described by way of example and with reference to the accompanying drawings in which:

FIG. 8b illustrates an example ontology of the knowledgebase of the smart device of FIG. 8a.

Some embodiments of the invention relate to a interpretation engine that may be implemented as a hardwired state machine that can interpret an ontology for a certain message-based interoperability architecture, such as that described in A. A. Syed, J. Lukkien, and R. Frunza, "An ad hoc networking architecture for pervasive systems based on distributed knowledge," 2009, and an ontology meta-model, such as Dolce. The format of the messages may also be fixed and predetermined. The interpretation engine may be programmed using the concept of recipes with a reduced set of predicates. The recipes comprise a series of steps, recorded as triples that can express how to trigger the functionality of the smart device that contains the interpretation engine.

An ad-hoc network of smart devices that each comprise an interpretation engine can be built. The interpretation engine may be capable of understanding the device functions of the smart device to which it belongs and is able to control these device functions in accordance with the prevailing environmental conditions.

Since the number of predicates is limited and can be used to express any type of knowledge, the interpretation engine is not limited to a type of device, such as lighting or wireless sensor networks, as long as the ontology model and the interoperability architecture are kept the same.

Also disclosed is a way to translate an ontology written using an RDF framework in which many predicates are used into a much simpler format with just three predicates. Such a form of triples with a restricted number of predicates may be used by an interpretation engine that is implemented as a state machine that is provided in hardware alone.

Although some of the described embodiments relate to the use of only three predicates, it is possible to implement an interpretation engine that is configured to recognise a different, predetermined, fixed plurality of predicates whilst benefiting from the advantages of improved efficiency or reduced cost. In this sense, the plurality of predicate values is fixed, in that it is invariable. The number of different values for the predicates may not be altered after the device has been implemented in hardware or firmware as the hardware, such as a logic configuration, cannot be altered.

The interpretation engine can interpret RDF triples and use simple compare operations on triples to make logical decisions. The interpretation engine may also perform other types of operations, such as arithmetic operations.

Proprietary information models may be used to provide the knowledgebase.

It will be appreciated that attributes of a unit or process described with regard to one example may be provided by an attribute or process in another example.

Figure 1:
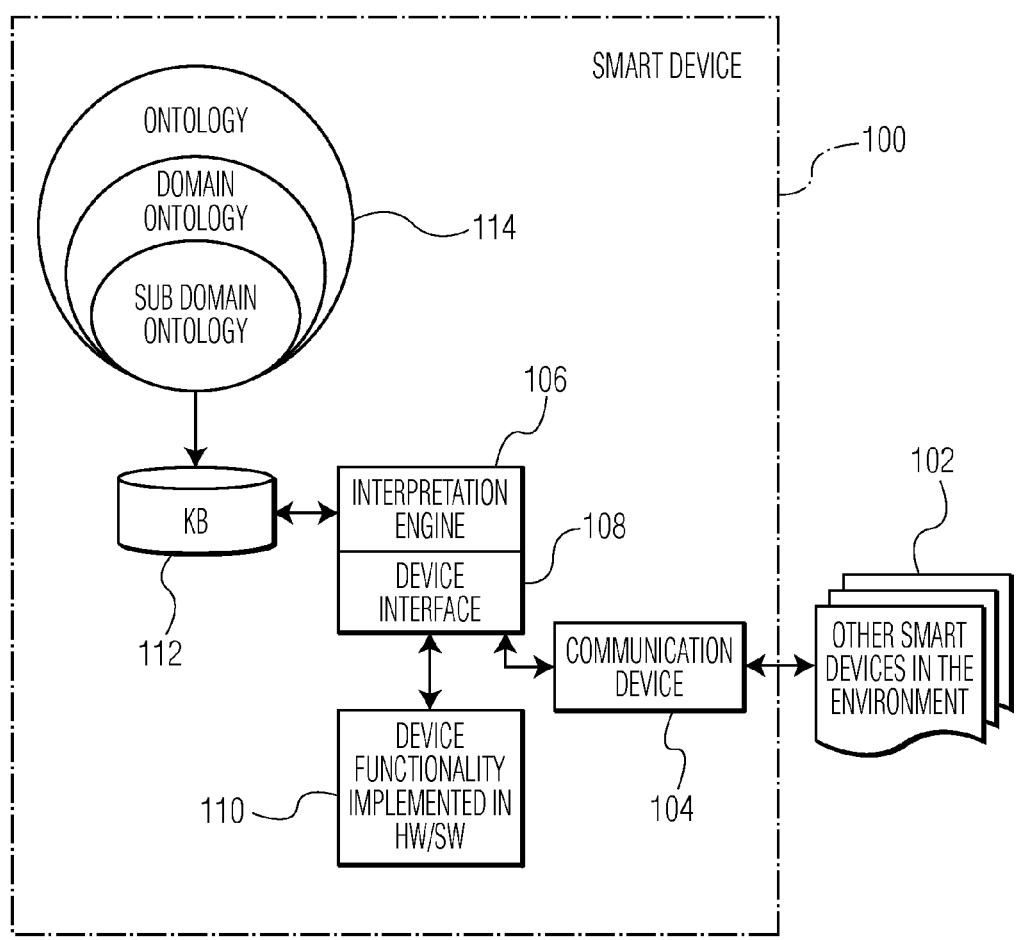
FIG. 1 illustrates a block diagram of a smart device.

FIG. 1 illustrates a block diagram of an interoperable device, also known as a smart device 100. The smart device 100 is configured to communicate with other smart devices 102 in its environment. The smart device comprises a number of sub-components including, amongst other things, a communication device 104, an interpretation engine 106, device functionality 110 and a knowledge base 112.

Communications with external smart devices 102 are handled by the communication device 104. The content and form of these messages will be described in further detail later. The interpretation engine 106 is connected to the communication device 104, preferably by a dedicated interface (not shown in FIG. 1).

The interpretation engine 106 controls the device functionality 110 of the smart device 100 in response to data received through the communication device 104 in accordance with information stored in an ontology 114 in the knowledge base 112. That is, the interpretation engine 106 is configured to receive data and to determine a function to be executed in response to the received data and in accordance with the knowledge base 112. Determining a function to be executed also encompasses determining if no function is to be executed in response to the received data and in accordance with a knowledge base. The function can be device functionality 110 of the interoperable device 100 or a communication function with another interoperable device 102 though the device interface 108.

The interpretation engine 106 is considered to be separate from the device functionality 102 in this example, although it will be appreciated that the functionality of the interpretation engine 106 may be considered to comprise the functions of units that are illustrated as being distinct from it in this example.

In an example where the smart device 100 is a lighting device, the device functionality 110 of the smart device 100 might be the functionality of a lamp consisting of LEDs and a driver circuit that can control the LEDs. The device functionality 110 may be implemented in hardware or software. Alternatively, the device functionality 110 may be a sensor function of the device.

The knowledge base 112 comprises a subset ontology that describes the smart device 100, and identifies of other devices types that this device can cooperate with. For example, the knowledge base of a smart device with lamp functionality could contain information about itself: that it is a lamp, that it produces light, and that it can work together with a switch and a sensor to control its light production.

An ontology of a domain is a formal description of entities in a domain and relationships between these entities in this domain. There are a number of meta-models for ontologies, such a Dolce, OWL and Protégé. A meta-model can be used to describe the device 100, its capabilities, its interactions with other devices 102, and a program, or recipe, for the device 102 to follow. The meta-model description can be stored in knowledgebase 112. The meta-model allows cooperation between devices 100, 102 in an environment. The Dolce model is used in some examples provided herein.

The knowledge base 112 can be constructed using different representations of knowledge/information. For example, the knowledge base 112 can be constructed using human readable format such as character string notation. A machine readable format such as integer representation with a dictionary to translate between human readable format and machine readable format is also possible. Of course using a string representation will have consequences for memory and interpretation engine size and performance requirements when provided as a hardwired (HW) implementation.

The knowledge/information in the knowledge base 112 is represented as a resource description framework (RDF). An RDF is a structure for representing information in the form of triples, that is, records with three units of data. This information can relate to information regarding a device as an entity in a domain and its relationship to other entities in that domain, for example. Each triple describing a piece of information consists of a subject, a predicate and an object, for example: [Man; owns-a-dog-named; Fluffy]). Further examples are discussed below with reference to FIGS. 4 and 5.

Recipes, or a series of instructions, recorded as RDF triples can be used as programs for smart devices 100 or for virtual devices. The logic of the interpretation engine 106 of the smart device 100 can be implemented as a hardwired circuit, rather than as a general purpose central processing unit, in order to run recipes. The provision of such a hardwired (HW) interpretation engine can reduce costs and save power. However, conventionally, the predicate of an RDF triple can be descriptive. For the example of the triples [Subject; Predicate; Object] that consists of: [Man; owns-a-dog-named; Fluffy], the predicate "owns-a-dog-named" describes that the "man" owns a "dog" and that the "dog" has a "name". Such predicates can be referred to as complex predicates. A knowledge base that allows complex predicates may contain an extensive number of different predicates, such as Owns-a-dog-named, Own-a-cat-named, Owns-dogs-named. An interpretation engine using such a knowledge base would have to know how to treat each different predicate in the knowledge base. Such an arrangement may not be practicable for a HW interpretation engine in all cases as the complexity of the hardwired logic increases with the number of types of possible predicate that may be encountered. In contrast, the subjects and objects in a domain on the other hand are usually limited in number and are easily described in an ontology.

The ontology-based information model and recipes in the knowledge base 112 of the smart device 100 are provided using a reduced set of predicates. The interpretation engine 106 is configured to recognize only a predetermined, fixed plurality of predicate values. By restricting the available choice for predicates to this predetermined, fixed plurality of predicate values, it is feasible to provide a hardwired (HW) interpretation engine 102 for interpreting and executing recipes that is smaller, cheaper and/or more power efficient than an interpretation engine that is implemented as a general purpose CPU running a program.

Some embodiments of the invention relate to a hardware interpretation engine (which may also be referred to as a hardwired interpretation engine herein) that can be linked to a variety of devices and can interpret an ontology-based knowledge base of a device to configure functions of a device for a wide variety of environments and contexts. By a hardwired interpretation engine, it is meant that the logic of the interpretation engine is provided as hardwired logic as opposed to a CPU where software resides in the hardware in order to perform logic. In such an example, the determination of a function to be executed is performed by hardware alone. The interpretation engine may use the data available in its knowledgebase to determine the function to be executed.

However, the use of a predetermined, fixed plurality of predicates may also allow a lower capability CPU (such as a reduced instruction set device) instead of a conventional general purpose CPU and so provides an interpretation engine that is smaller, cheaper and/or more power efficient. Other aspects of the invention may be provided by an interpretation engine that is at least partially provided as software.

A predicate in the knowledge base 112 may take one of a predetermined, fixed plurality of values. Such as: "is-a", "has-a" and "is". In this example, the predetermined, fixed plurality of values is three values. In other examples, the value may be four or more. However, it will be appreciated that the complexity of the logic required to operate the interpretation engine 106 increases as the number of possible predicated values increases.

The Interpretation engine 106 of FIG. 1 allows simple functionality devices to be provided for less cost in a smart environment. Examples of such devices include lamps and sensors. These devices can be adaptable to a context and may show emergent behaviour. Such devices typically perform only a very limited set of operations (functions) such as "Turn on", "Turn off", "Dimm to a given level" or "Change colour to some value" in order to fit requirements provided in a message from an environment.

Figure 2:
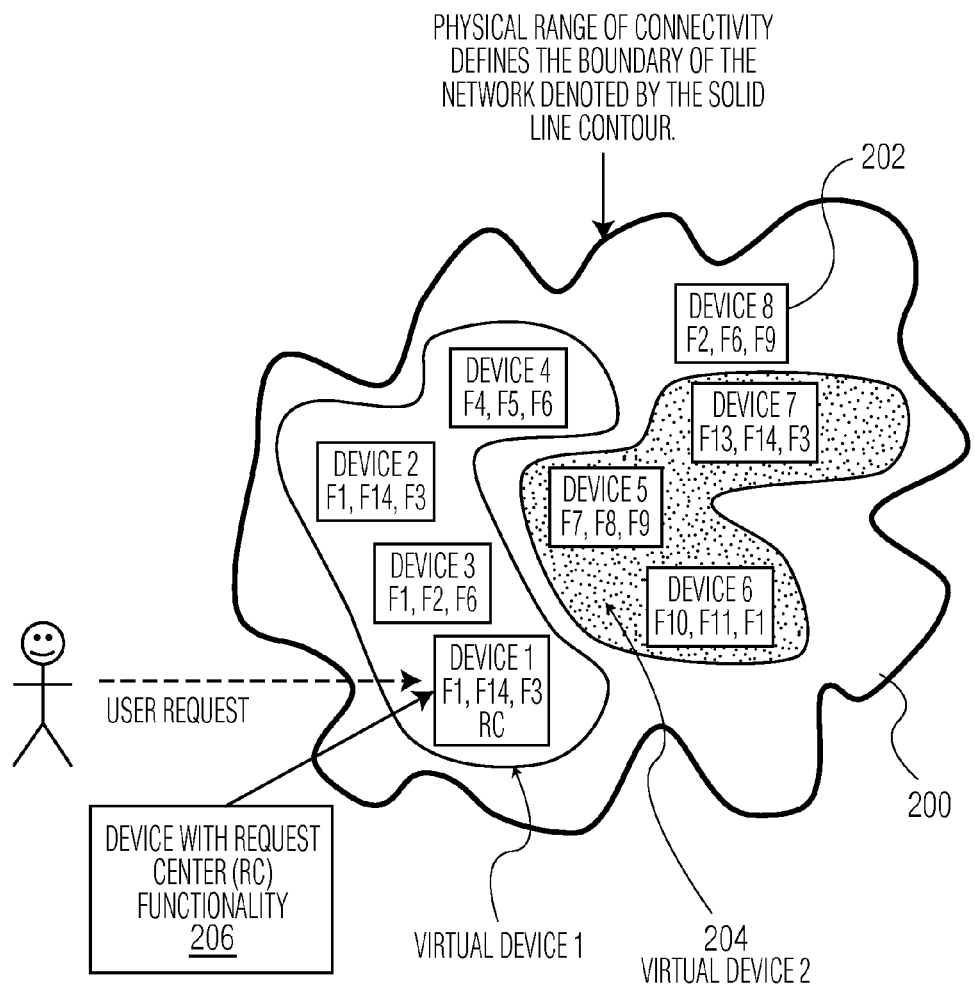
FIG. 2 illustrates a block diagram of a network comprising smart devices.

FIG. 2 illustrates a block diagram of an environment 200 that comprises a plurality of smart devices 202 in a network. Devices 202 in the environment can be considered as a pool of resources. These resources may be available, or not, depending on whether the resources are preoccupied. In this example, all of the smart devices 202 in the network are equipped with a knowledge base that describes the functionality of the smart device 202 and possible reactions to events that can appear in the environment 200. The smart devices 202 are also all provided with an interpretation capability that can interpret the knowledge base in order to steer device functionality.

A request, or message, can be entered into the request centre by a user and then sent into the environment using a request centre device 206. The request centre is configured to send data to the devices in the network. The data can relate to messages/requests that are configured to instruct the virtual machine to provide a function. That is, the data is indicative of a function to be performed and comprises one or more relationships that are structured in triplets. Each triplet comprises a subject, a predicate and an object.

The request centre device 206 is configured to use only a predetermined, fixed plurality of predicate values. The predetermined, fixed plurality of predicate values used by the request centre device 206 is typically the same predetermined, fixed plurality of predicate values that the interpretation engines of the devices 202 within the virtual devices 204 (also referred to as virtual machines) are configured to recognize.

When the request is received by one of the devices 202, the device 202 decides whether or not to respond to the request by providing functionality required by the request. The decision whether to respond to a request is made by the interpretation engine of the device 202 by using the knowledge stored in its own knowledge base. If more than one smart device responds to the message, the requesting device may select a device to allow to join the virtual machine by considering a predetermined criterion, such as which of the devices was the first to respond. The selected smart devices 202 then effectively join a group of other devices 202 in order to perform the required function as an aggregate of smart devices 202. This aggregate of the smart devices 202 in a sub-network is called a virtual device 204. A virtual device can be identified in an environment by, for example, a unique identification (UID) number and can be addressed using the UID number. In some examples, data addressed to a virtual device is only interpreted by its constituent devices; other devices in the environment ignore this data.

An interpretation engine may be used in smart spaces where re-configurability of device functionality is important in response to changes in the environment. In the architecture illustrated in FIG. 2, the interpretation engine described with reference to FIG. 1 may be provided to understand or respond to a number of types of messages. Examples of message types are listed below.

Search message—A "search message" is used to find devices that are available to participate in a virtual device.

Acknowledge message—The "acknowledge message" is used to answer search requests to form a virtual device.

Accept message—An "accept message" is sent to inform some device that it is being accepted as a part of a virtual device.

Destroy message—A "destroy message" is sent when the task for which a virtual device was established has been accomplished. The virtual device is therefore no longer needed and can be destroyed. The devices forming this virtual device can then return to the pool of free devices or resources in the environment.

Control message—A "control message" is sent to control a particular functionality of a certain virtual device. Only the devices that are part of this virtual device and can perform the action associated with this message react to it.

Data message—A "data message" is used to propagate data in a virtual device. This could be for example sensor values.

Shout message—A "shout message" is used to issue a mandatory request to which all devices in the environment must listen to this message irrespective of whether they already are engaged in a virtual device and therefore not available as a free resource. This message is used, for example, in emergency condition when all devices must respond to the emergency condition.

Internal message—An "internal message" is sent by a device to itself, for example to wake itself up when a timed event occurs.

Figures 3, 4:
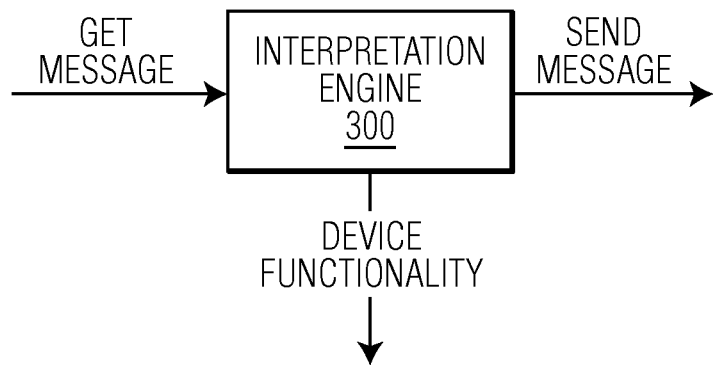
FIG. 3 illustrates a block diagram of an interpretation engine.
FIG. 4 illustrates an example of a triple.

FIG. 3 illustrates a representation of an interpretation engine 300 that always reacts to a message that it receives on its communication interface. On receipt of the message, the interpretation engine 300 parses information from the message and, in accordance with information within the knowledge base, controls device functionality or communicates with devices in the environment. A message that is not understood is dropped.

The interpretation engine 300 can only perform operations about which it has knowledge. If a device does not know about a function, then it cannot perform it and therefore it can ignore any messages regarding this function.

A knowledge base of a smart device can be provided so as to provide data necessary for the interpretation engine 300 to make decisions, process requests, interpret messages and react to commands. The knowledge base can also describe device capabilities, environments in which device can be used, procedures that the device follows in response to a request from its environment and some state data.

The procedures that a device follows in response to a request from its environment are called recipes. A step of a recipe, the entire recipe or a request may all be considered to be forms of data that can be received by the interpretation engine. Recipes in a knowledge base are sequential steps that a device should follow in a particular virtual device when a certain set of environmental conditions prevail. A set of such environmental conditions are called a "context". In one example of a recipe, the recipe has a header to describe the type of the recipe, and conditions that guard access to this recipe. These conditions may check if a certain context is active or if a certain person is present, for example, and accordingly allow the processing of a certain recipe or not.

Steps contain actions that need to be performed in a sequential order. If the device fails to finish a step, the recipe can be dropped by the interpretation engine and the smart device may return to idle state. Every step in a recipe can result in invoking a device function, creation of some data structure which constitutes a message, storing local state information, invoking the communication interface to send a message, stopping processing of a recipe when the last step is reached or dropping the recipe.

The interpretation engine 300 matches information from a request and decides if it is able to perform a task. If an appropriate recipe is found the device executes functions associated with the steps in the recipe. Actions performed by a device may depend on:

existing configurations in the device, which define state information about a device such as whether it is already engaged in a virtual device;

context in the environment;

availability of other devices; and an actual recipe present in the knowledge base of the particular device.

An example pseudo-code for the steps performed by the interpretation engine 300 is provided below.

Initialize: determine the identity of this particular device and capabilities of the device described in the knowledge base Receive and parse an incoming message or signal Recognize message type or drop message when not understood Search knowledge base for an appropriate recipe corresponding to this message type and/or context (if present)

Interpret the recipe to identify an appropriate action to perform, this could be Configure/perform own device function Send an acknowledge message back to the device that sent the original message Send a message to the network to look for other devices to complement its own functionality in the prevailing context in the environment.

Go to "Receive and parse incoming message signal" step above.

FIG. 4 illustrates another example of an RDF triple which describes the piece of information that an "apple-tree is-a tree". The triple consists of a subject, "Apple-Tree", a predicate "Is-a" and an object "Tree". As can be seen from this example, a triple can express a simple concept, using a simple predicate.

In a conventional ontology knowledge base, predicates in the knowledge base typically represent a very specific relationship between two entities in ontology classes. These predicates often have appropriate names that are, preferably, understandable by humans. For example, to associate classes or objects to a class Person, predicates such as "hasName" or "hasAddress" may be provided. These predicates may be referred to as "complex predicates", as these predicates describe a very specific relationship that requires prior knowledge of a particular meaning to the words used. In such a formulation, the number of predicates grows when a new class or a new relationship is added.

An advantage of using complex predicates, from the point of view of constructing the ontology, is that such predicates make the ontology more easily readable for humans. Unfortunately, this requires that the interpreting algorithm must be aware of the different predicates that are used in defining ontology of a domain. Thus, extendibility of ontology of a domain to incorporate new relationships is not possible without changing the interpretation algorithms as well. In general, a domain and its ontology evolve as new concepts are invented and new relationships are added to a domain.

In order to build an interpretation algorithm that can be fixed and implemented in HW with lower power consumption and lower cost, it is necessary to limit a set of predicates to a relatively low value, such as three or four predicates that is predetermined and fixed.

Figure 5:
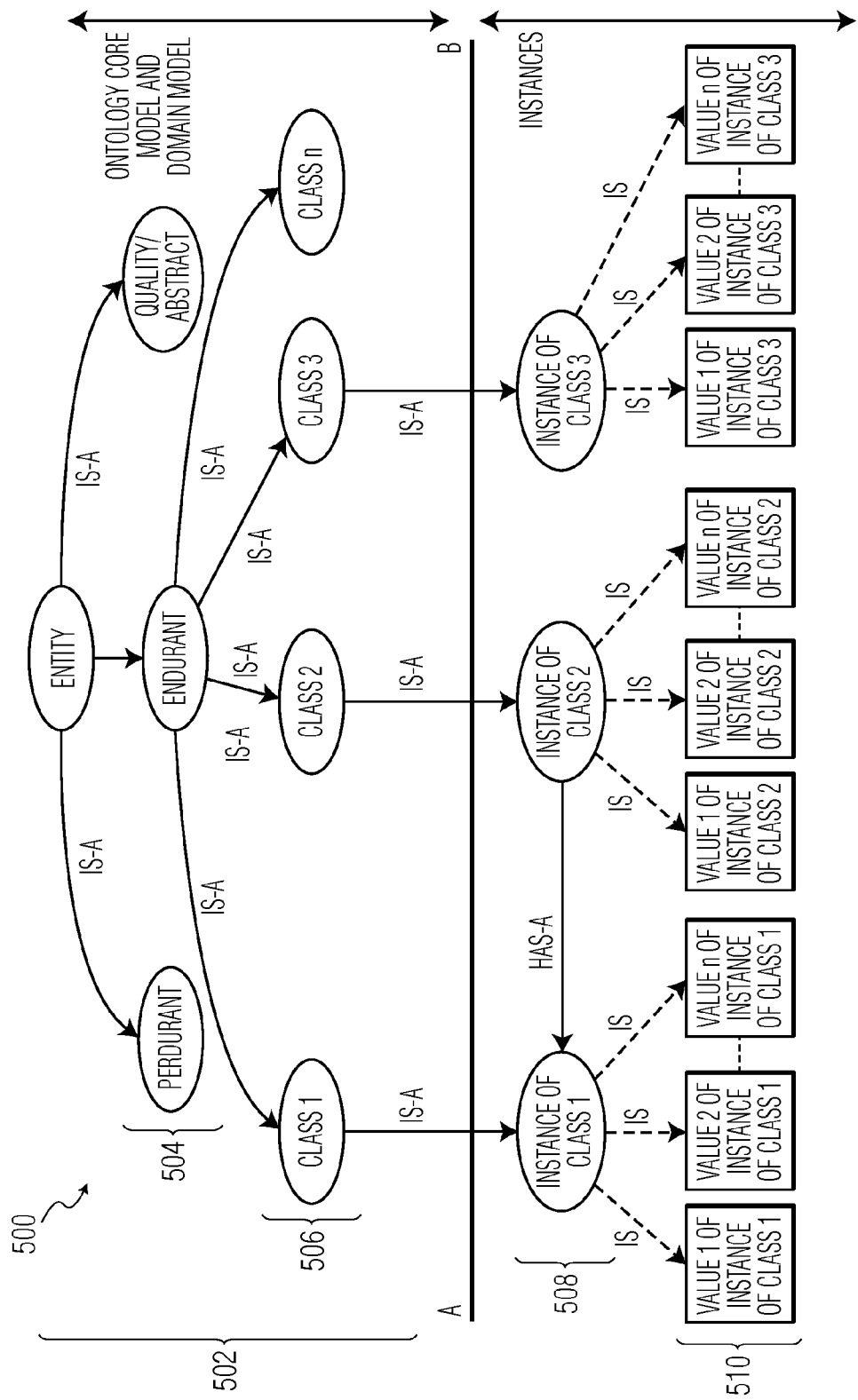
FIG. 5 illustrates an ontology knowledgebase.
Figure 6:
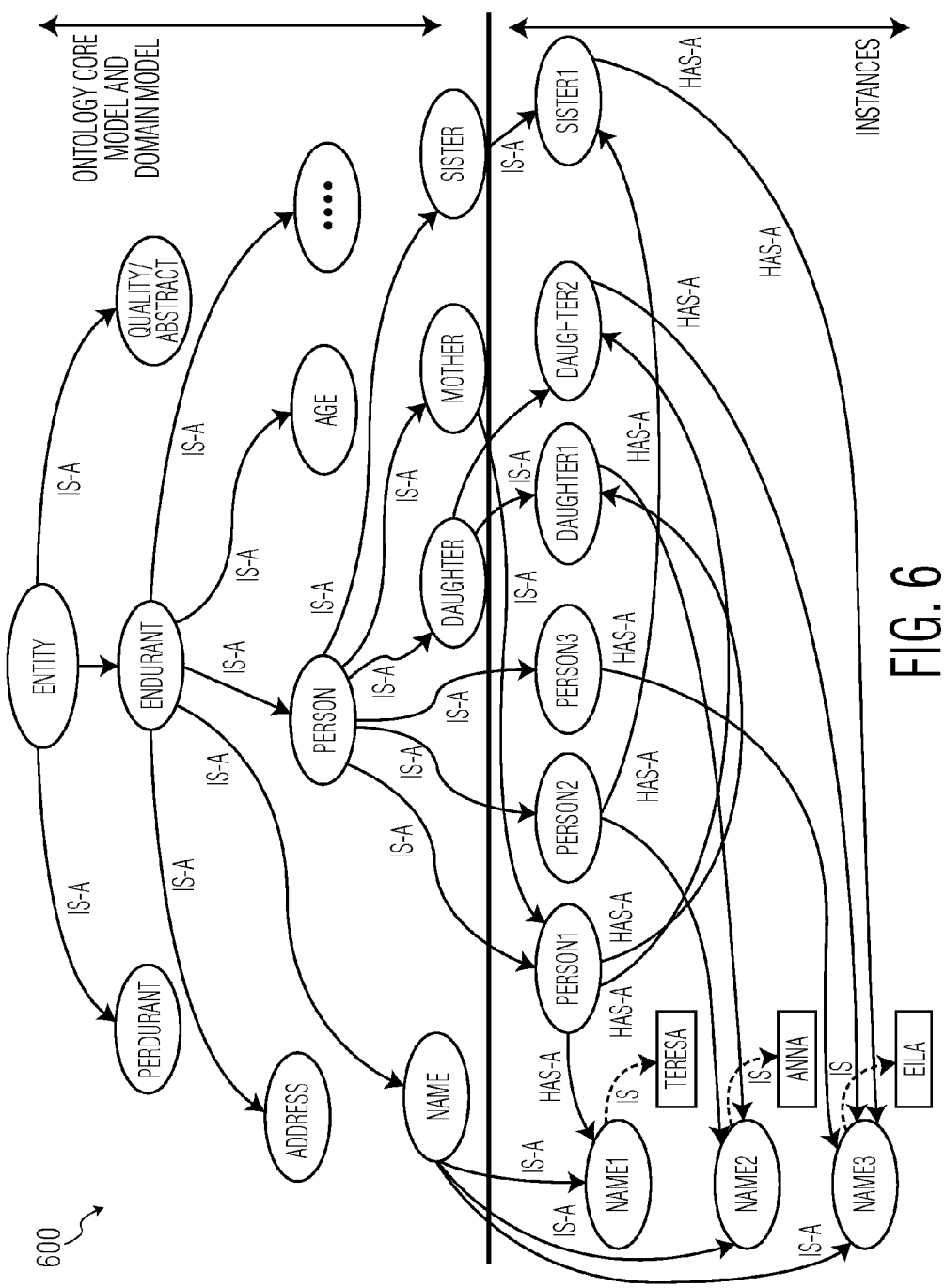
FIG. 6 illustrates another ontology knowledgebase.

FIGS. 5 and 6 describe the provision of a knowledge base comprising a simplified, or restricted set of predicate from a knowledge base comprising complex predicates. To resolve this issue with complex predicates, we use some rules in defining ontology. In this example, it is assumed that an ontology meta-model, such as Dolce, has been chosen. It is also assumed that a domain ontology (an ontology that expresses a relationship in a specific domain, such as lighting) has been defined. When defining instances of a class, links to the other instances of classes drawn from the ontology domain model can also be defined. This methodology enables the construction of instances of a class and also its relationship to other instances. For defining classes, instances of classes and relationship between different instances, only three predicates are allowed, namely "Is-a", "Has-a" and "Is". The predicate "Is-a" indicates that the subject belongs to a class denoted by the object. The predicate "Has-a" indicates that the subject comprises or possesses the object. The predicate "Is" indicates that the subject takes a literal value denoted by the object.

FIG. 5 shows a model of an ontology 500 defined according to the rules as described above. In FIG. 5, the upper part 502 above line AB consists of the ontology core model, or meta-model (defined using Dolce, in this case), and also a domain ontology which describes the entities and relationships in a domain, such as a lighting domain, for example.

In Dolce, an ontology can be defined as a set of classes and their super classes. This description follows a meta-model where all entities in a universe are described as derived from one of three classes 504: endurant, perdurant, and quality/abstract. A universe is described as a tree of classes that stem from these three basic classes.

Endurants are entities that can be observed/perceived as a complete concept at any point in time. Examples of an endurant entity are material objects, such as an apple or a human, or abstract 'fiat' objects, such as an organisation or the border of a country.

Perdurants are entities for which only a part exists if we look at them at any given snapshot in time. Processes, such as the act of running, are examples of perdurants. At a given point in time only part of the process of running is observable; without any previous knowledge one might not even be able to determine the actual process being performed as being the process of running.

Qualities inhere to entities: every entity (including qualities themselves) comes with certain qualities, which exist as long as the entity exists.

Classes 506 of the endurant type are illustrated in FIG. 5. Each of the classes 506 is related to the endurant super-class by an "Is-a" predicate. Instances 508 of some of the classes 506 are also illustrated below the line AB. The instances 508 of the classes 506 are related to their parent class by an "Is-a" predicate. The instances 508 of the classes 504 are linked to each other using a "Has-a" predicate and literal values 510 of each of the instances 508 are pointed to with an "Is" predicate.

In this way it is possible to specify complex objects that are composed of objects of many classes by defining a "Has-a" relationship between them. By checking the links between a first thing (which may be a super class, class, instance or value) to a second thing, the type of the second thing can be found. This is achieved by finding any thing pointed to by a "Has-a" predicate of the first thing and then by checking the link pointed to by an "Is-a" predicate of the second thing, which will point to a class in the domain ontology. The values for the different parameters of an instance can be read by following the link pointed to by the "Is" predicate of the second thing.

Formulating the ontology using only the three predicates "Is-a", "Has-a" and "Is" results in an increased granularity of the ontology, meaning that the machine readability of the ontology is improved, but at the disadvantage that the ontology becomes less readable by humans. That is, limiting the number of possible predicate values to just three values makes the ontology more easily processed by simple logic that is suitable for implementing in hardware. Such an ontology structure, together with an interpretation engine configured to act on the knowledge base, is particularly suited for devices that are limited functionality devices, such as sensors and simple actuators such as lamps. Such devices only need to know a small subset of an ontology related to the functions that the device can perform and which other devices it can cooperate with.

In order to provide a simplified ontology that uses simple predicates, it may be necessary to translate a complex ontology to a simplified ontology. For example, a knowledge base may be provided that contains triples that have complex predicates:

Complex Knowledge base
Person is-mother-of Person
Person is-sister-of Person
Teresa is-a Person
Anna is-a Person
Eila is-a Person
Teresa is-mother-of Anna
Teresa is-sister-of Eila To find a daughter of "Teresa", an algorithm must have knowledge of at least one of the specific predicates; "is-mother-of" or "is-daughter-of". A vocabulary must be agreed between the ontology and an algorithm that is used to search the ontology. The vocabulary must be able to express the notion of parenthood and/or daughterhood. Without such a vocabulary, it is impossible for the algorithm to retrieve information contained within a predicate that indicates that a relation between two people and to determine that the mother's name is "Teresa" and that the daughter's name is "Anna". For example, if the algorithm searches for "Teresa", two familial relationships are possible: those related to the "is-mother-of" and "is-sister-of" predicates. The algorithm (a reasoning mechanism) cannot make a valid decision which predicate to choose without knowing the meaning of the predicates, or the value of the predicate required. Therefore predicates need to be known to the algorithm in advance.

In this example, the list of predicates cannot be extended without informing the reasoning algorithm. Adding a triple [Person; is-grandmother-of; Person] to a knowledge base is not enough, the reasoning algorithm must be given the knowledge about a new predicate, namely, "is-grandmother-of", otherwise the reasoning algorithm will not be able to make use of the information contained within the new predicate.

In general, it is very difficult to have absolute knowledge about what new relationships will develop. For example, in human societies, new relationships (both non-biological and biological relationships) can emerge as domains develop; a car mechanic did not exist before the cars were developed and therefore one could not talk of a car mechanic-customer relationship. It is therefore difficult to fix predicates, especially for domains that can change over time. In a lighting domain, new device types and functions can be added to an existing ontology. On the other hand, in order to keep the reasoning mechanism the same, the set of predicates must be fixed to allow for a simplified interpretation engine architecture and also to provide backwards compatibility with existing smart devices without the need to upgrade the interpretation engines of the existing smart devices as the knowledge base develops. It is possible to specify a complex predicate knowledge base with a limited set of predicates. The simplified knowledge base provided below is equivalent to the complex knowledge base listed above.

| Simplified Knowledge base | |
|---|---|
| Mother is-a Person | Daughter is-a Person |
| Sister is-a Person | Person1 is-a Person |
| Person1 has-a Name1 | Name1 is-a Name |
| Name1 is Teresa | Person2 is-a Person |
| Person2 has-a Name2 | Name2 is-a Name |
| Name2 is Anna | Person3 is-a Person |
| Person3 has-a Name | Name3 is-a Name |
| Name3 is Eila | Person1 is-a Mother |
| Person1 has-a Daughter1 | Daughter1 is-a Daughter |
| Daughter1 has-a Name2 | Person1 has-a Daughter2 |
| Daughter2 is-a Daughter | Daughter2 has-a Name3 |
| Person2 has-a Sister1 | Sister1 is-a Sister |
| Sister1 has-a Name3 | |

FIG. 6 is a representation of the ontology 600 of the simplified knowledge base listed above and is used to illustrate how relationships between instances can be created. The ontology structure is similar to that described with reference to FIG. 5 and will not be discussed further here in detail.

In FIG. 6, the predicate "Is-a" points to a class up the ontology tree. That is, for the triple [Person2; Is-a; Person] the object of the predicate is the class "Person" and the subject is the instance "Person2". The predicate "Has-a" points either to an instance of the same class (that is, the subject and object of the relationship belong to the same class) or an instance of another class and thus sideways in the ontology tree. For example, the instance "Person2" is a subject in the relationships [Person2; Has-a; Name2] and [Person2; Has-a; Sister1]. Both "Person2" and "Sister1" belong to the "Person" class, whereas "Name1" is an instance of the "Name" class and so belongs to a different class to "Person2".

The predicate "Is", points to a literal value for a particular thing and is down in the ontology tree; the triple [Name2; Is; Anna], for example.

Figure 7:
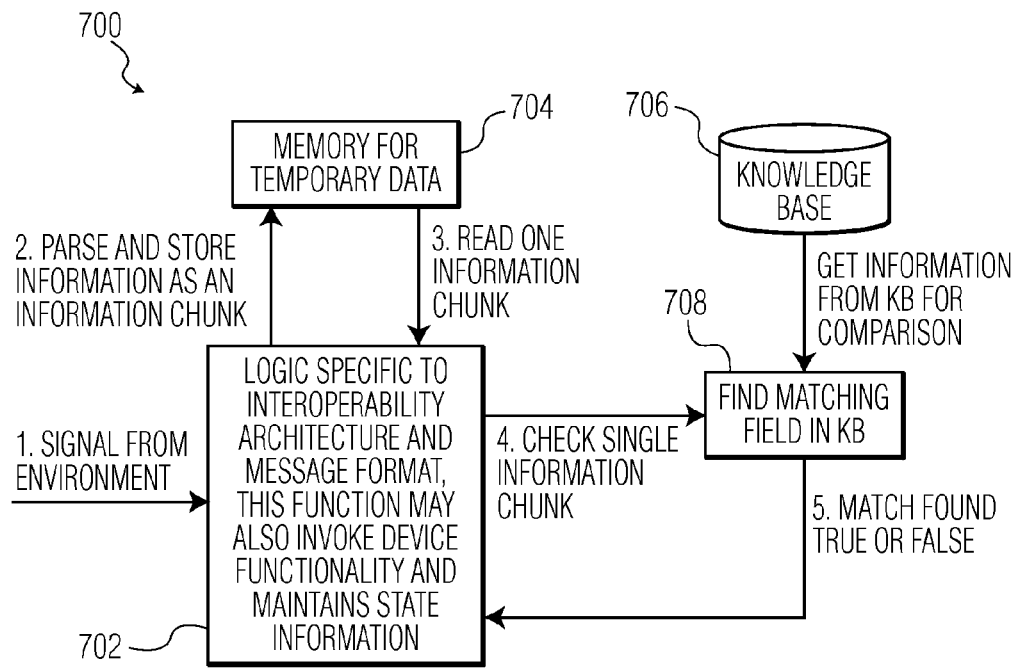
FIG. 7 illustrates a block diagram for functions of an interpretation engine.

FIG. 7 is a block diagram that shows a set of functions that may be performed by an interpretation engine 702 in sequence. The interpretation engine 702 is coupled to a memory 704 for temporary data and a knowledge base 706.

The sequence of functions performed by the interpretation engine 702 is as follows:
1. The interpretation engine receives a signal comprising a message from the environment. The message may comprise a recipe for performing a function.
2. The message is parsed and stored in a temporary memory.
3. The embedded logic reads information from the received message one chunk at a time. A chunk may be in the form of a single RDF triple.
4. The embedded logic checks a single chunk for a TRUE or a FALSE condition by attempting to match this chunk with the information in the knowledge base of the device 700.
5. A TRUE condition is generated when a match is found and a FALSE when no match is found.

The finding matching field functionality 708 may be provided as part of the knowledge base 706, as part of the interpretation engine 702 or a separate function.

A TRUE condition is a signal to the device that it can match the input information with the information in its own knowledge base, and therefore that the device is aware of this piece of information. The processing of next chunk can then follow. A FALSE indicates that the device does not have this information and thus does not understand the message and the processing of the received signal should stop. When the processing of subsequent chunks keeps on returning a TRUE condition, then eventually a functionality of the device 700 is invoked, or some other action is taken, which could be sending out a message to the environment or on completion of a recipe going into an idle state and waiting for a new message. The functions of the device 700 are performed by invoking a device interface, which in this example is provided within the interpretation engine 702. Examples of states that an interpretation engine implemented as a state machine can occupy are discussed in further detail in FIG. 9.

Figure 8A:
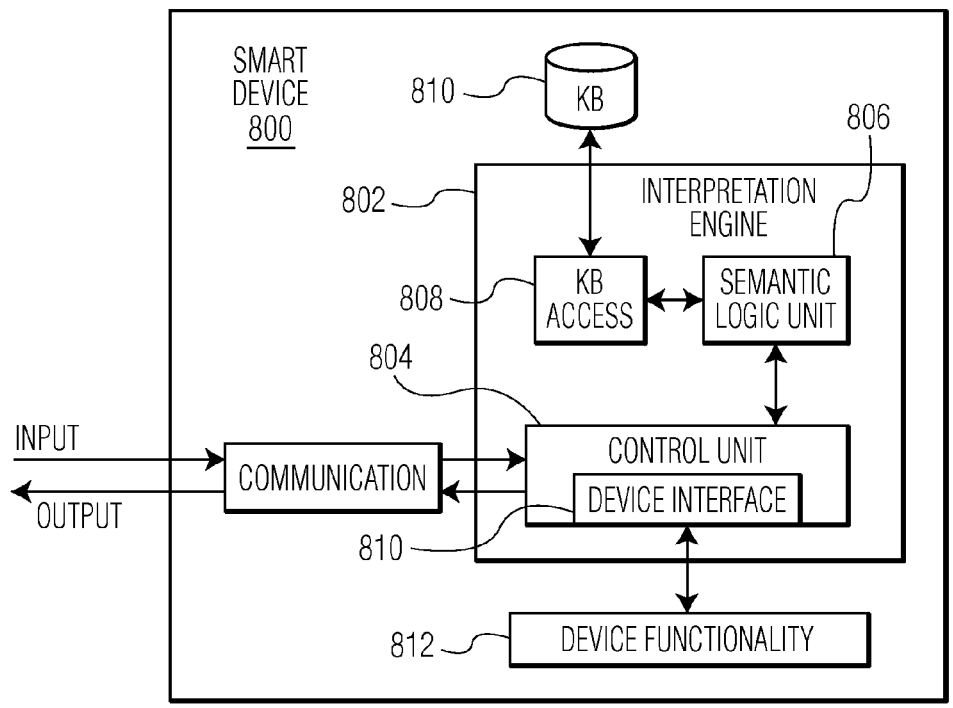
FIG. 8a illustrates a block diagram for a smart device.
Figure 8B:
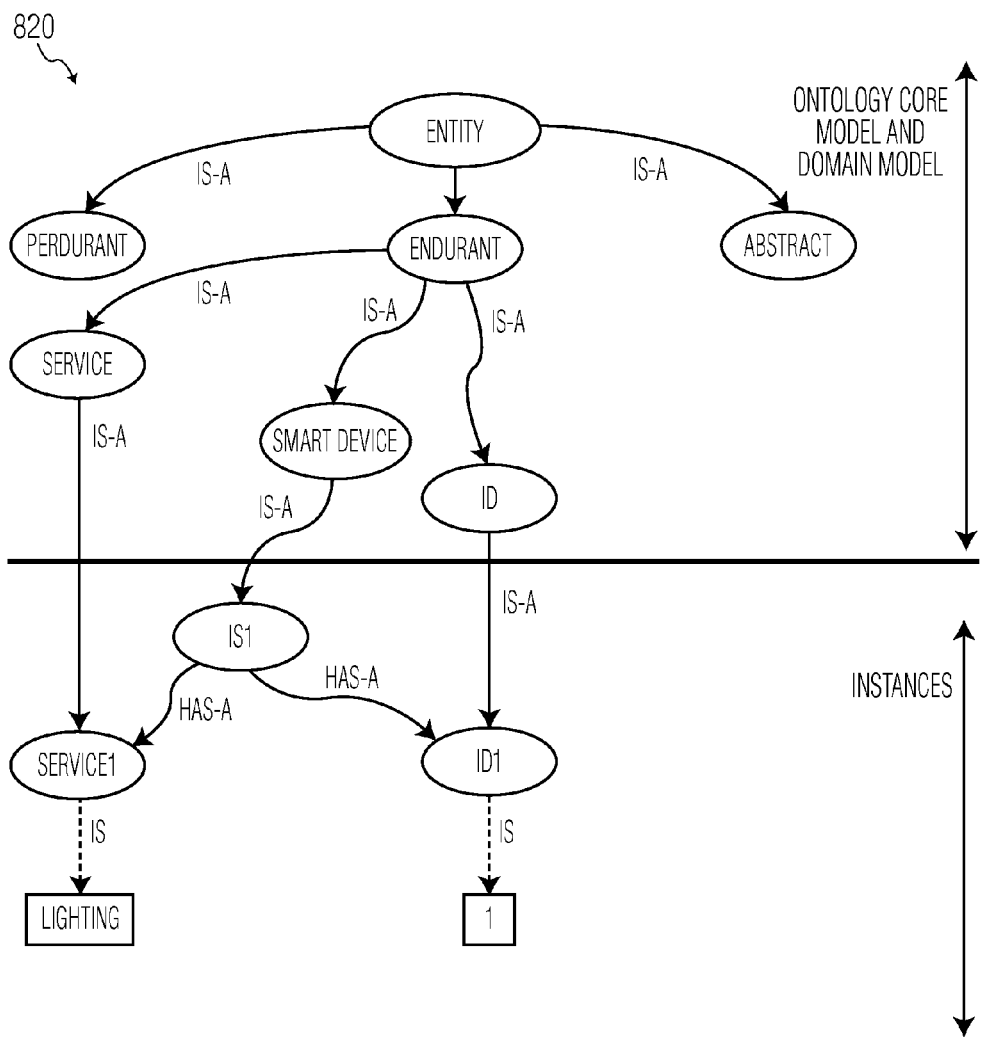

FIG. 8a illustrates a block diagram of another smart device 800. FIG. 8b illustrates an ontology 820 that describes device information for the smart device 800. The structure of the ontology 820 is similar to that described in FIGS. 5 and 6.

In the smart device 800, an architecture for an interpretation engine 802 is shown in further detail. The interpretation engine 802 comprises a control unit (CU 804), a knowledge base access unit (KB Access unit 808) and semantic logic unit (SLU 806). The CU 804 has a device interface 810 that can connect to simple device functions 812 to actuate them. The knowledge base access unit 808 provides access to the knowledge base 810.

It will be appreciated that the tasks performed by units of the interpretation engine 802 may be separated out in a number of ways to different sub-units and so that, for example, a task assigned to the CU 804 in FIG. 8a could instead be preformed by an SLU in another example.

Some concepts of interoperability architecture and the way the recipes are composed constitute some knowledge that can be referred to as "common knowledge". Common knowledge in this case could be the concept of a virtual device, context, configuration, or recipes, for example, identified with some key words.

In a network comprising a plurality of the smart devices 800, the interpretation engine 802 embedded in each devices must have access to the common knowledge in order to be able to interpret recipes for interoperability architecture.

The CU 804 is responsible for interpreting requests by invoking the SLU 806 to interpret the information retrieved from knowledge base 810 and the information in the received message. The CU 804 can have some common knowledge embedded within it. The common knowledge of the CU 804 consists of a vocabulary of key words which are defined by the chosen interoperability architecture. Examples of such keywords are discussed further below.

The KB Access unit 808 is responsible for searching the knowledge base for required triples and delivering them to the SLU 806.

The SLU 806 is responsible for processing simple compare operations on the triples list delivered by the KB Access unit 808. This processing can be performed on a triple-by-triple (that is, chunk-by-chunk) basis, resulting in a TRUE or a FALSE condition for each comparison. The SLU 806 keeps on processing the delivered triples until it finds a match or it runs out of triples in the list.

When the processing of a triple results in a TRUE condition, the SLU 806 returns a TRUE to the CU 804. When the SLU 806 has finished processing the delivered triples and no match has been found, then the SLU 806 returns a FALSE to the CU 804. When the SLU 806 returns TRUE then this indicates that the knowledge base 810 of a device contains information about the query being posed to it and the following step defined by a recipe that is being followed or as coded into a state machine, such as that described with regard to FIG. 9, in the control unit can be followed. A state machine follows a predetermined logical path depending on the conditions with which it is supplied. The machine only ever occupies a single state at any one time.

If the SLU 806 returns a FALSE, then the knowledge base 810 of the device 800 does not contain information about the query being posed and thus the recipe or the control flow in the state machine can be dropped and the device can return to its idle state. Specifically, if the result of a comparison is affirmative, then the CU 804 resolves the next action to be performed in a particular situation. Possible actions include updating the knowledge base 810 with device state data, sending a message to the communication link or sending a signal to the device functionality 812 to trigger device functions or to stop the current operation when a "StepStop" keyword is encountered in the recipe being processed. If "StepStop" is encountered, then this also indicates successful completion of the recipe being processed.

All of the temporary data such as matched lists and data about the device status is saved in a part of the knowledge base 810 in the RDF format.

The SLU 806 can perform two types of queries on the knowledge base 810: "Match-Subject-Return-Object" and "Match-Object-Return-Subject".

The "Match-Subject-Return-Object" query matches a subject in a given RDF triple for a known predicate and creates a list of objects in the knowledge base 810 that match the subject and the predicate. The SLU 806 can then search through this list for an object that is it is looking for and generates a TRUE as described above when the required object is found and a FALSE otherwise.

The "Match-Object-Return-Subject" query matches an object in a given RDF triple for a known predicate and creates a list of subjects in the knowledge base 810 that match the object and predicate. The SLU 806 can then search through this list for a subject that it is looking for and generates a TRUE as described above when the required subject is found and a FALSE otherwise.

As a simple example, when looking for the existence of triple [Person1; is-a; Mother] in the knowledge base illustrated in FIG. 6, a query "Match-subject-Return-Object" for predicate "Is-a" and subject "Person1", would results in a list of triples:

[Person1; is-a; Person];
[Person1; is-a; Mother].

The SLU 810 can then sort through this list and find the object "Mother" and generate a TRUE condition if the item sought is found, or a FALSE otherwise.

Similarly, when looking for the triple [Mother Is-a Person], searching using the object "Person" and the predicate "Is-a" in a "Match-Object-Return-Subject" query would results in a list of triples:

[Mother; is-a; Person];
[Daughter; is-a; Person];
[Sister; is-a; Person];
[Person1; is-a; Person];
[Person2; is-a; Person]; and
[Person3; is-a; Person].

Again, the SLU 806 can run through this list and find the matching triple if it exists and generate a TRUE condition if the item sought is found, or a FALSE otherwise.

The memory elements in the knowledge base 810 can be arranged in a variety of manners, including content addressable memories (CAM), serial memories or associative memories. The knowledge base 810 can be divided into three separate sections based on the different predicate used in the knowledge base 810, namely "Has-a", "Is-a" and "Is". That is, the memory is content addressable memory that comprises the knowledge base and the memory is categorized according to values of predicates of relationships in the knowledge base. Thus when a query is posed to the CU 806, the memory search can be restricted to the section of the memory reserved for one particular predicate that appears in the query. This way, memory can be search about three times faster than if the memory were arranged as RAM.

When the interoperability engine 802 is provided with non-volatile temporary memory, it may be possible to switch off the whole device completely except for the message receiver function of the smart device 800. The smart device 800 may also be awakened and start processing without any need for restoring any states in the device. This functionality can further improve the performance of the smart device 800.

In order to follow a recipe, the smart device 800 may perform the following steps. Suppose that the smart device 800 has been initialized and that it has received a message from the environment that is meant for devices that have a certain property. In order for the interpretation engine 802 of the smart device 800 to find out if the smart device has the desired property, the following steps can be taken:

Step 1: Find all occurrences of the identifier of this device in the knowledge base of this device with predicate "Has-a".

Step 2: Find out which of these entities is an instance of the class we are looking. To check the class, refer to the ontology domain model.

Step 3: If Step 2 is successful, then find if the KB has a value for this property equal to what is required. The value is pointed to by the "Is" predicate.

As an example, to show how a recipe is followed by the interpretation engine 800, the following is a description of the contents of the knowledge base 810. The knowledge base 810 comprises device information and a recipe that can perform the actions of determining whether a device has lighting services and, if it does, turning on the light. Alternatively, the recipe need not be stored in the smart device 800 and can be provided to the device from the environment. The recipe may be provided to the smart device together with a message that requests that smart devices with the necessary device functionality perform the recipe. The interpretation engine 802 can be configured to store recipes received from the environment in the knowledge base 810. The contents of the device information table (below) are also represented by the ontology 820 in FIG. 8b.

| Device Information | | |
|---|---|---|
| LS1 | Is-a | SmartDevice |
| LS1 | has-a | id1 |
| id1 | is-a | id |
| id1 | is | 1 |
| LS1 | has-a | service1 |
| service1 | is-a | service |
| service1 | is | lighting |
| on_off | is-a | command |
| recipe1 | is-a | recipe |
| Recipe | | |
| Recipe1 | has-a | service1 |
| Recipe1 | has-a | Recipe1S1 |
| Recipe1S1 | is-a | step |
| Recipe1S1 | has-a | Recipe1S2 |
| Recipe1S2 | is-a | step |
| Recipe1S2 | has-a | TurnOn |
| TurnOn | is-a | action |
| TurnOn | has-a | deviceFunction |
| TurnOn | has-a | turnOn1 |
| turnOn1 | is | 1 |
| Recipe1S2 | has-a | Recipe1S3 |
| Recipe1S3 | is-a | step |
| ... | | |
| Recipe1Sn | is-a | step |
| Recipe2Sn | has-a | stepStop |

The identity of the device 800 is known to the device after the initialization using information from the knowledge base 810. The objects in bold letters in the table above are common knowledge keywords.

In this example, the knowledge base 810 contains a device description, namely that this device is called "LS1", it has an "id" which is "1" etc. When the smart device 800 gets a request which is meant for devices that offer lighting services, then the interpretation engine 802 of the smart device can check if its knowledge base contains information about lighting service. This check can be performed by posing the query: Match-Subject-Return-Object (LS1, Has-a). The SLU 806 will generate a list of triples for which the subject is LS1 and the predicate is "Has-a". In this case, the list will consist of the following two triples:

| LS1 | has-a | id1; |
| LS1 | has-a | service1. |

The SLU 806 will then search through this list to find an object for which, in the domain ontology model, an "Is-a" predicate link points to class "service". In the example above, "service1" is an instance of the class "service" as described by the triple [service1; Is-a; service]. Once the SLU 806 has found that object (service1, in this case), it will check if that object has a value pointed to by the "Is" link which has the value "Lighting", as present in the triple [service1; Is; lighting]. In the present example, the SLU will return a TRUE condition.

In a similar way, the CU 804 can now look for the recipe in the knowledge base and follow the linked steps of the recipe. When the interpretation engine 802 reaches the keyword "StepStop" in the recipe then the device returns to a state in which it waits for a new message.

The above description provides a method for operating an interoperable device comprises receiving data, such as a request/message, and determining a function to be executed in response to the received data and in accordance with the knowledge base 812. The knowledge base 812 comprises one or more relationships that are structured in triplets, each triplet comprising a subject, a predicate and an object. The received data may also be structured in triples. The predicate can only take one of a predetermined, fixed plurality of predicate values.

In this example, the step of determining a function to be executed in response to the received data and in accordance with a knowledge base 812 comprises comparing a value of the received data with a relationship in the knowledge base 812. This comparison may be performed by the SLU 806 using the Match-Subject-Return-Object or Match-Object-Return-Subject procedures described above. The function to be executed can be determined in accordance with an outcome of the comparison. That is, a recipe may then be found by the CU 804 that relates to a request in the received data. The interpretation engine 802 can then follow this recipe in order to provide a function. If it is determined that a function is to be executed, then the interpretation engine 802 can then trigger the device functionality 812 of the smart device through the device interface 810 and the device functionality 812 can then execute the function.

By expressing the knowledge base of a device in these simple predicates, the interpretation engine can be built as a state machine that can read the knowledge base of a device and perform the steps defined in a recipe. Since number of predicates is small, just three in this example, the number of different logical paths in the hardwired (HW) is also relatively small and makes a HW implementation affordable. It also makes it possible to express a large variety of conditions for a range of different domains using the same HW interpretation engine and using different knowledge bases constructed by using knowledge from the different respective domains, such as a lighting domain and an air conditioning domain.

Figure 9:
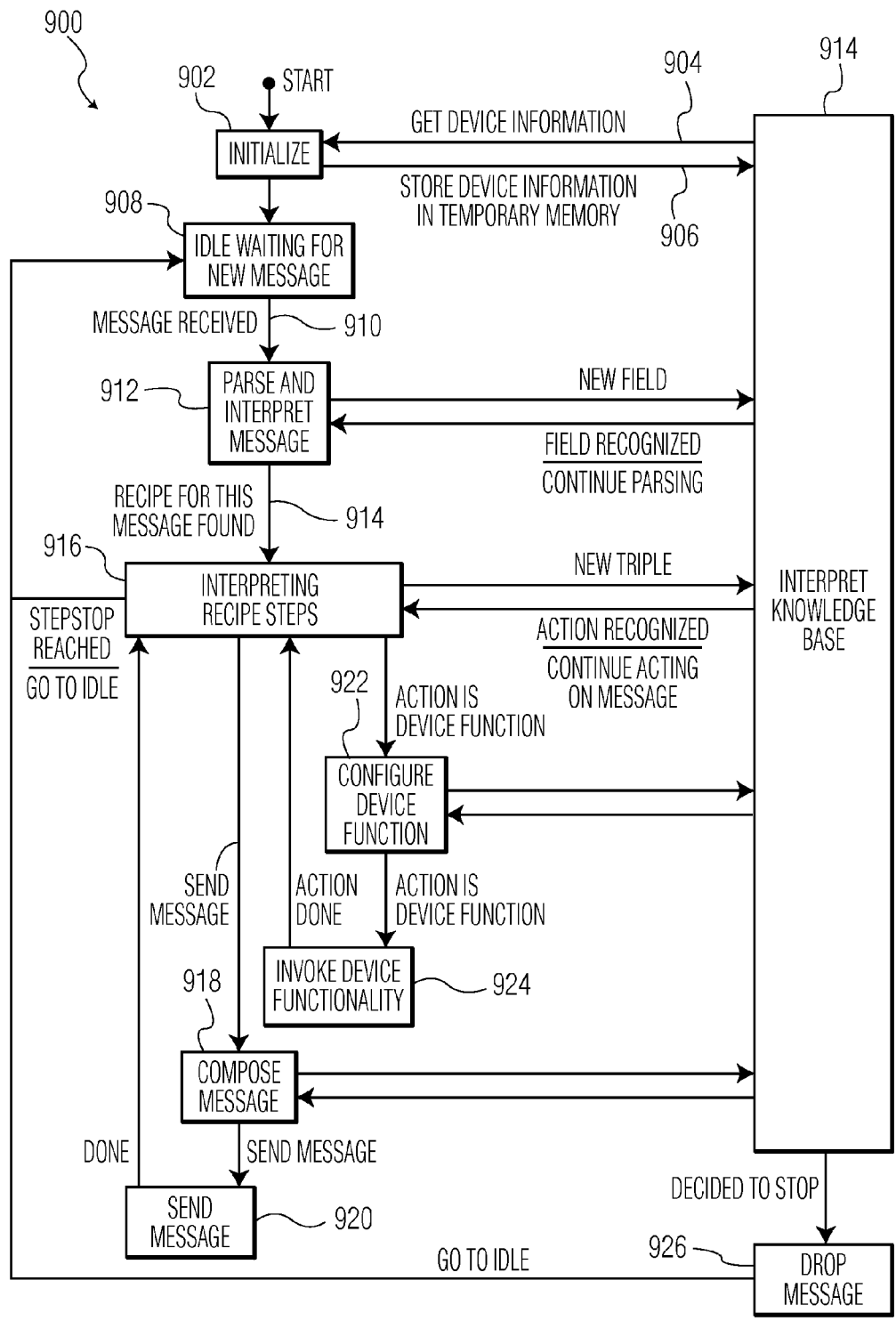
FIG. 9 illustrates a state diagram for an interpretation engine.

FIG. 9 illustrates a state diagram 900 for an interpretation engine implemented as a state machine. The state machine can be provided using hardware as would be apparent to one skilled in the art.

The state diagram 900 illustrates a number of states, including an "initialize" state 902, a "idle waiting for new message" state 908, a "parse and interpret message" state 912, an "interpret knowledgebase" state 914, an "interpreting recipes" state 916, "compose message" state 918, a "send message" state 920, a "configure device function" state 922, an "invoke device functionality" state 924, and a "drop message" state 926. The state machine performs different logic tasks in each state.

When a device is turned on, a start signal transitions the device into the "initialize" state 902. In the "initialize" state 902, the device reads 904 its knowledge base to understand what type of device it is and what functions it can perform. This device functionality information is written 906 into a temporary location in a working memory portion of its knowledgebase, ready to be accessed for later use.

The device transitions to the "idle waiting for new message" state 908 once initialization is complete. In this state 908, the device waits for a message from the environment.

When a message is received 910, the interpretation engine goes into the "parse and interpret message" state 912. The message can be considered to be received data. In the "parse and interpret message" state 912, the interpretation engine transitions to, and back from, the "interpret Knowledgebase" state 914. In the "parse and interpret message" state 912, the engine determines which type of message has been received, and which recipe should be executed. If, while in this state 912, the interpretation engine finds 914 a recipe for the received message type, the interpretation engine transitions to the "interpreting recipe steps" state 916.

In the "interpreting recipe steps" state 916, the interpretation engine reads and interprets the recipe steps from the knowledgebase and performs the required actions. When, during the processing of a recipe, an instruction to send a message is reached, the interpretation engine transitions to the "compose message" state 918. In this state 918, the interpretation engine reads a recipe from the knowledgebase and interprets it to compose a message that has to be sent. When the interpretation engine has composed the message, it transitions to the "send message" state 920. In this state 920, the interpretation engine invokes the communication interface of the device to send the composed message. After the message has been sent, the interpretation engine transitions back to the "interpreting recipe steps" state 916.

If, while in the "interpreting recipe steps" state 916, the interpretation engine finds an instruction to use a device function, it transitions to the "configure device function" state 922. In this state 922, the interpretation engine interprets the steps in the recipe that it is processing to find a parameter to configure the device function. The interpretation engine then invokes its interface to the device functionality in an "invoke device functionality" step 924.

The interpretation engine transitions to the "idle waiting for new message" state 908 from the "interpreting recipe steps" state 916 if it encounters the "StepStop" keyword in a triple of the recipe that it is processing. Also, if the interpretation engine is not able to find relevant knowledge in the knowledgebase while in the "interpreting recipe steps" state 916, then it takes this as a signal to stop and transitions to the "idle waiting for new message" state 908. This transition may be performed via a "drop message" state 926.

The invention claimed is:

1. An interoperable device comprising interpretation engine and a memory, the interpretation engine comprising hardwired logic and configured to receive data and to determine a function to be executed in response to the received data and in accordance with a knowledge base that comprises one or more relationships that are structured in triplets, wherein each triplet comprises a subject, a predicate and an object, and wherein the interpretation engine is configured to recognize only a predetermined, fixed plurality of predicate values;
wherein the predetermined plurality of predicate values is three values, wherein each predicate can only take a value from the set:
a predicate that indicates that the subject belongs to a class denoted by the object;
a predicate that indicates that the subject comprises or possesses the object;
a predicate that indicates that the subject takes a literal value denoted by the object;
wherein the determination of a function to be executed is performed by the hardwired logic;
wherein the function is a function of the interoperable device or a communication function with another interoperable device;
wherein the memory is content addressable memory that comprises the knowledge base and the memory is categorized according to values of predicates of relationships in the knowledge base.

2. The interoperable device of claim 1, wherein the interpretation engine is configured to determine if no function is to be executed in response to the received data and in accordance with the knowledgebase.

3. The interoperable device of claim 1, wherein the memory comprises non-volatile memory and the interpretation engine is configured to enter a sleep state when it is not responding to received data.

4. The interoperable device of claim 1, wherein the interoperable device is configured to execute a function that the interpretation engine has determined is to be executed.

5. A virtual machine comprising one or more of the interoperable devices of claim 1, connected in a network.

6. A method for operating an interoperable device, the method comprising:
receiving data; and
determining a function to be executed in response to the received data and in accordance with a knowledge base,
wherein the knowledge base comprises one or more relationships that are structured in triplets, each triplet comprising a subject, a predicate and an object, and wherein the predicate can only take one of a predetermined, fixed plurality of predicate values;
wherein the predetermined plurality of predicate values is three values, wherein each predicate can only take a value from the set:
a predicate that indicates that the subject belongs to a class denoted by the object;
a predicate that indicates that the subject comprises or possesses the object;
a predicate that indicates that the subject takes a literal value denoted by the object;
wherein the determination of a function to be executed is performed by hardwired logic and wherein the knowledge base is stored in content addressable memory that is categorized according to values of predicates of relationships in the knowledge base;
wherein the function is a function of the interoperable device or a communication function with another interoperable device.

7. The method of claim 6, wherein the received data is received from a network comprising a request centre and/or another interoperable device.

8. The method of claim 6, wherein determining a function to be executed in response to the received data and in accordance with a knowledge base comprises:
comparing a value of the received data with a relationship or a subject, predicate or object of a relationship in the knowledge base; and
determining a function to be executed in accordance with an outcome of the comparison.

9. The method of claim 6, further comprising executing the function if it is determined that a function is to be executed.

* * * * *